United States Patent [19]

Shinno

[11] Patent Number: 4,719,884
[45] Date of Patent: Jan. 19, 1988

[54] COMBUSTION CHAMBER WITH A DOMED AUXILIARY CHAMBER FOR A SPARK-IGNITION ENGINE

[75] Inventor: Yoshio Shinno, Osaka, Japan
[73] Assignee: Kubota Ltd., Osaka, Japan
[21] Appl. No.: 825,581
[22] Filed: Feb. 3, 1986
[51] Int. Cl.⁴ .................. F02B 19/12; F02B 19/18
[52] U.S. Cl. .................................. 123/269; 123/262; 123/286
[58] Field of Search ............... 123/262, 268, 269, 286, 123/256, 279

[56] References Cited

U.S. PATENT DOCUMENTS

| | | | |
|---|---|---|---|
| 3,270,721 | 9/1966 | Hideg et al. | 123/269 X |
| 3,963,003 | 6/1976 | Downs | 123/269 X |
| 4,005,684 | 2/1977 | Habu | 123/269 |
| 4,207,844 | 6/1980 | Schlotterbeck | 123/269 |
| 4,325,334 | 4/1982 | Nishida et al. | 123/286 X |
| 4,433,647 | 2/1984 | Muller | 123/286 X |

FOREIGN PATENT DOCUMENTS

| | | | |
|---|---|---|---|
| 2659100 | 6/1978 | Fed. Rep. of Germany | 123/269 |
| 0475179 | 2/1936 | United Kingdom | 123/262 |

Primary Examiner—Willis R. Wolfe, Jr.
Attorney, Agent, or Firm—Schwartz, Jeffery, Schwaab, Mack, Blumenthal & Evans

[57] ABSTRACT

The present invention relates the technology to enhance the mixing performance of air-fuel mixture in a combustion chamber with a domed precombustion chamber for a spark-ignition engine, and aims to attain the enhanced mixing performance owing to the forcible generation of a multiplicity of small swirls by forcing the air-fuel mixture to flow into the main combustion chamber centripetally from the inside of the cylinder and then to turns three times in a step-like state with being accelerated on the way into the precombustion chamber through the connecting channel at the compression stroke. The main combustion chamber is formed by hollowing the center side portion of the piston head. The piston head is further provided with the connecting channel formed on the annular bank around the main combustion chamber so as to be faced onto by the domed precombustion chamber in the cylinder head and to be stepped up higher than the bottom of the main combustion chamber.

11 Claims, 7 Drawing Figures

COMBUSTION CHAMBER WITH A DOMED AUXILIARY CHAMBER FOR A SPARK-IGNITION ENGINE

BACKGROUND OF THE INVENTION

1. Field of the Invention

The present invention relates to a construction of a combustion chamber for a spark-ignition engine.

More particularly, it relates to a combustion chamber for an engine provided with a domed auxiliary chamber in the cylinder head thereof.

2. Prior Art

In a spark-ignition engine, in order to suppress the generation of nitrogen oxide and carbon monoxide, the prior engine, for example as disclosed in U.S. Pat. No. 4,433,647 published on Feb. 28, 1984, is so constructed that a domed auxiliary chamber provided with a spark plug is formed in the cylinder head and the auxiliary chamber is connected with a cylinder chamber (a main combustion chamber) by an aperture so as for a turbulent flow of air-fuel mixture to be compressed into the auxiliary chamber at the compression stroke.

However, since the top surface of the piston in the above-mentioned prior art engine with a domed auxiliary chamber is formed flat, the flow of air-fuel mixture compressed into the domed auxiliary chamber is apt to become relatively large swirls. Therefore, the mixing rate of fuel and air can't be enhanced sufficiently.

And on the other hand, in a diesel engine with a swirl chamber, which is formed as a domed cavity in the cylinder head and in which a mouthpiece as a pre-chamber cup is fitted at the entrance thereof to form the swirl chamber, the cylinder head for the diesel engine is intended to be used in common as a cylinder head for a spark-ignition engine by omitting the mouthpiece and making use of the domed cavity as the domed auxiliary chamber for the spark-ignition engine in order to enhance the mass-productivity and reduce the manufacturing cost thereof.

However, in this case, the disposition, the shape, and the capacity of the domed auxiliary chamber for the spark-ignition engine are restricted by the common utilization with the swirl chamber for the diesel engine. Therefore, the mixing condition of fuel and air for the air-fuel mixture gets worse and accordingly the mixing rate thereof also takes a turn for the worse.

SUMMARY OF THE INVENTION

The present invention is directed to solving the problems noted above, and has such an advantageous feature as there are provided a main combustion chamber formed by hollowing the center side portion of the piston head top surface, and a channel formed for connecting the domed auxiliary chamber with the main combustion chamber at the position of the bank of the piston head where the auxiliary chamber faces, so as for the bottom of the connecting channel to be stepped up higher than the bottom of the main combustion chamber in order to enhance the mixing rate of fuel and air in the engine with the domed auxiliary chamber in the cylinder head.

According to the present invention, since the piston head is provided with the main combustion chamber by hollowing the center side portion of the top surface thereof and the connecting channel formed at the position of the bank thereof where the auxiliary chamber faces, so as for the bottom of the channel to be stepped up higher than that of the main combustion chamber, the air-fuel mixture is forced to flow into the main combustion chamber at the central portion of the piston head centripetally from the inside of the cylinder and then compressed into the auxiliary chamber through the connecting channel at the compression stroke. At this moment, further since the flow of air-fuel mixture turns three times in a step-like state with being accelerated through the connecting channel at the compression stroke, a multiplicity of small swirls are generated forcibly in the flow of air-fuel mixture. Accordingly the air-fuel mixture is to be compressed into the auxiliary chamber with being stirred and mixed violently.

The foregoing and other objects and atendant advantages of the present invention will be readily appreciated as the same become better understood by reference to the following detailed description when considered by the accompanying drawings, wherein:

DETAILED DESCRIPTION OF THE PREFERRED EMBODIMENTS

Figure 1:
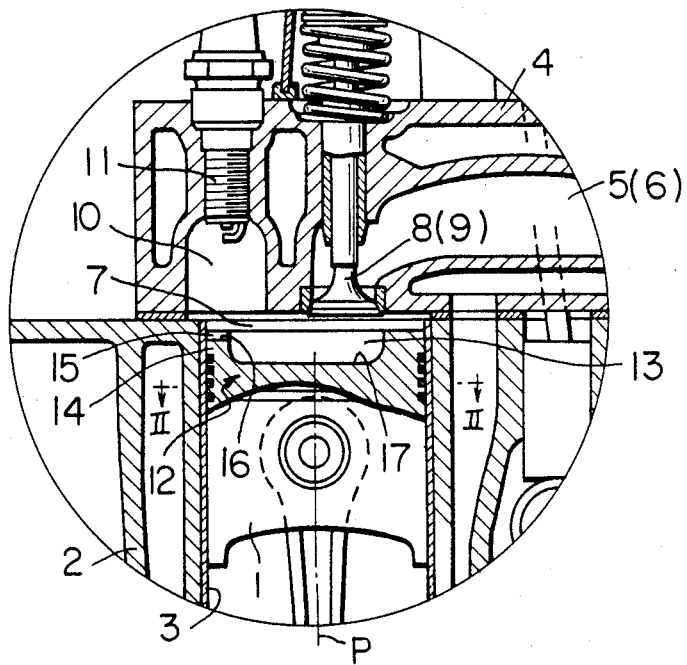
FIG. 1 is an elevational view in vertical section showing the principal part of a preferred embodiment of a combustion chamber for a spark-ignition engine of the present invention.
Figure 2:
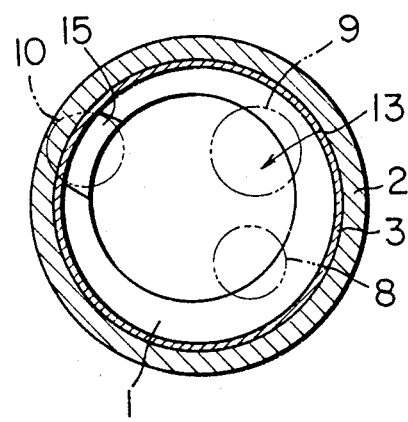
FIG. 2 is a sectional plan view on line II—II in FIG. 1.
Figure 3:
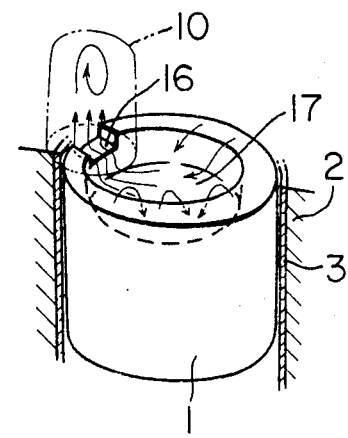
FIG. 3 is a perspective view of the piston head shown in FIG. 1.

In FIGS. 1 and 2, 1 is a piston; 2 is a cylinder block; 3 is a cylinder liner; and 4 is a cylinder head. The cylinder head 4 has a intake port 5 and an exhaust port 6 provided with a intake valve 8 and an exhaust valve 9 respectively at each end thereof so as to face to the inside of a cylinder 7. And the cylinder head has an auxiliary chamber 10 formed like a dome at a peripheral portion of the inner surface thereof so as to face to the inside of the cylinder 7 and a spark plug 11 screwed in the top of the inner wall for the precombustion chamber 10.

In the engine having above-mentioned construction, the feature of the present invention is that the combustion chamber thereof is constructed as the following.

That is, the piston 1 has a main combustion chamber 13 formed by hollowing the center side portion of the head 12 thereof and a connecting channel 15 formed of the circumferential bank 14 around the hollowed main combustion chamber 13 so as to face to the auxiliary chamber 10.

The domed auxiliary chamber 10 is in a standing posture substantially parallel to the axis of the cylinder 7 and overhangs partially outside the inner surface of the cylinder 7 in the plan view. And the main combustion chamber 13 is disposed eccentrically toward the domed auxiliary chamber 10 relative to the piston head 12.

As shown in FIG. 2, the connecting channel 15 is formed in parallel with the line joined between the piston center P and the auxiliary chamber 10 in the plan view. The width of the channel 15 is a little larger than the diameter of the aperture of the auxiliary chamber 10, which leads to the inside of the cylinder 7. The depth of the channel is shallower than that of the main combustion chamber 13 so that the bottom 16 thereof is stepped up higher than that 17 of the main combustion chamber 10.

Figure 4:
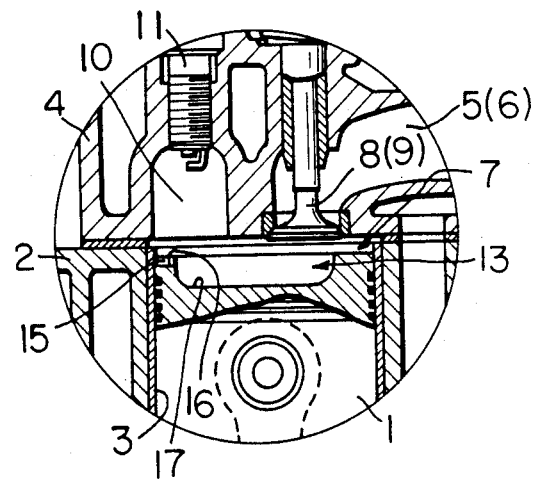
FIGS. 4 and 5 are the views of other preferred embodiments corresponding to FIG. 1.
Figure 5:
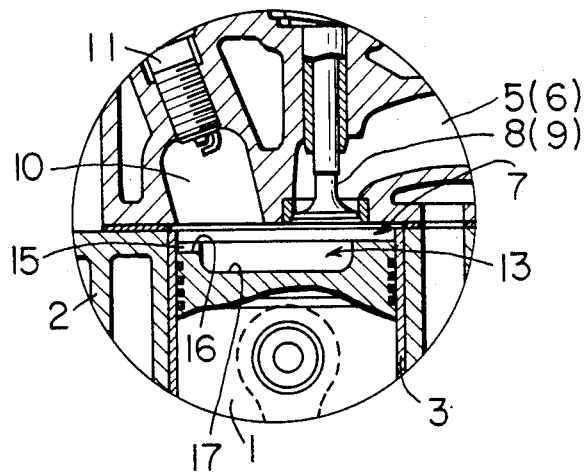

In other embodiments shown in FIGS. 4 and 5, the positions of the auxiliary chamber 10 are varied. The auxiliary chamber 10 shown in FIG. 4 is formed so as to touch internally to the inner surface 18 of the cylinder liner in the plan view. Further the auxiliary chamber 10 shown in FIG. 5 is formed with such gradient as its aperture gets nearer to the center of the cylinder 7.

Figure 6:
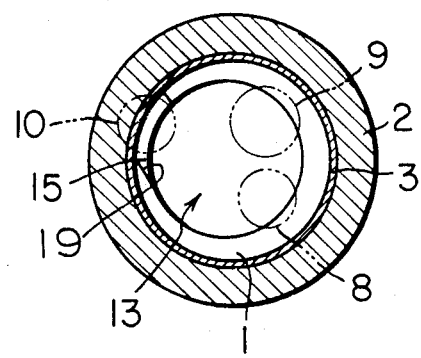
FIGS. 6 and 7 are the views showing the variations of the connecting channel corresponding to FIG. 2.
Figure 7:
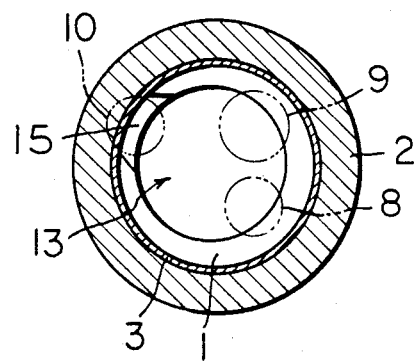

The variations of the connecting channel 15 are shown in FIGS. 6 and 7. The channel 15 shown in FIG. 6 is formed in a parallel channel of which side wall 19 connects the inner surface of the main combustion chamber 13 to that of the auxiliary chamber 10 in a tangent state between these two circular inner surfaces. The connecting channel 15 shown in FIG. 7 is tapered off toward the outside of the cylinder.

As described above, in the combustion chamber with the domed auxiliary chamber for the spark-ignition engine, the piston head is provided with the main combustion chamber by hollowing the center side portion of the top surface thereof and the connecting channel which is formed at the position of the bank thereof where the auxiliary chamber faces, so as for the bottom of the channel to be stepped up higher than that of the main combustion chamber. Therefore, when the air-fuel mixture sucked in the cylinder is forced to flow into the main combustion chamber of the piston head centripetally from the inside of the cylinder and then into the auxiliary chamber through the connecting channel at the compression stroke, the flow of air-fuel mixture turns three times in a step-like state with being accelerated so that a multiplicity of small swirls are generated forcibly in the flow. Accordingly, since air and fuel in the mixture are stirred and mixed so well that the mixing performance, the flame propagation velocity and the combustion performance are enhanced greatly, the fuel consumption of the engine is improved and also the engine output is increased.

Further since a multiplicity of small turbulences of air-fuel mixture can be generated violently in the swirls throughout the combustion chamber, the lean mixture can be utilized and the mixture can be completely combusted so that the generation of the noxious compositions in the exhast gas can be prevented effectively.

I claim:

1. A combustion chamber having a domed auxiliary chamber for a spark-ignition engine, comprising:
   (a) a cylinder (7);
   (b) a main combustion chamber (13) within the cylinder (7);
   (c) a cylinder head (4) above the cylinder (7);
   (d) a domed auxiliary chamber (10) having a circumference and being formed in a hollow portion of the cylinder head, a part of the circumference extending over the main combustion chamber (13);
   (e) a spark plug (11) in the domed auxiliary chamber (10);
   (f) a piston having a piston head (12) thereon positioned in the cylinder (7); and
   (g) said piston head being provided with a connecting channel (15) in an annular bank around the main combustion chamber (13) and being positioned opposite the auxiliary chamber (10), the channel (15) having a bottom (16) stepped higher than a bottom (17) of the main combustion chamber (13).

2. A combustion chamber with a domed auxiliary chamber for a spark-ignition engine according to claim 1, wherein the domed auxiliary chamber 10 partially overhangs outside the inner surface of the cylinder (7) in the plan view.

3. A combustion chamber with a domed auxiliary chamber for a spark-ignition engine according to claim 1, wherein the domed auxiliary chamber (10) has an inlet aperture with an inner circular surface which nearly touches internally the inner circular surface of the cylinder (7) in the plan view.

4. A combustion chamber with a domed auxiliary chamber for a spark-ignition engine according to claim 1, wherein the domed auxiliary chamber is formed in a vertically standing position substantially parallel to the cylinder (7).

5. A combustion chamber with a domed auxiliary chamber for a spark-ignition engine according to claim 3, wherein the domed auxiliary chamber (10) is formed with such a gradient as the inlet aperture gets nearer to the center of the cylinder (7).

6. A combustion chamber with a domed auxiliary chamber for a spark-ignition engine according to claim 1, wherein the connecting channel (15) is tapered off in the plan view.

7. A combustion chamber with a domed auxiliary chamber for a spark-ignition engine according to claim 1, wherein the connecting channel (15) is spread out like an unfolded fan relative to the inside of the cylinder (7) in the plan view.

8. A combustion chamber with a domed auxiliary chamber for a spark-ignition engine according to claim 1, wherein the connecting channel (15) is directed tangentially relative to the inner circular surface of the cylinder (7) in the plan view.

9. A combustion chamber with a domed auxiliary chamber for a spark-ignition engine according to claim 1, wherein the main combustion chamber (13) is disposed eccentrically toward the domed auxiliary chamber (10) relative to the piston head (12).

10. A combustion chamber with a domed auxiliary chamber for a spark-ignition engine according to claim 1, wherein the connecting channel (15) has a width only slightly larger than the diameter of an aperture in the auxiliary chamber leading to an inside of the cylinder (7).

11. A combustion chamber with a domed auxiliary chamber for a spark-ignition engine according to claim 1, wherein the connecting channel (15) has a width substantially the same as the diameter of an aperture in the auxiliary chamber leading to an inside of the cylinder (7).

* * * * *